(12) United States Patent
Chang et al.

(10) Patent No.: US 7,024,729 B2
(45) Date of Patent: Apr. 11, 2006

(54) ROTATION APPARATUS

(75) Inventors: Hung-Wei Chang, Taipei (TW);
Jui-Liang Ho, Taipei (TW);
Chyun-Nan Liu, Taipei (TW)

(73) Assignee: Arima Computer Corporation, Taipei (TW)

( * ) Notice: Subject to any disclaimer, the term of this patent is extended or adjusted under 35 U.S.C. 154(b) by 109 days.

(21) Appl. No.: 10/605,274

(22) Filed: Sep. 19, 2003

(65) Prior Publication Data

US 2004/0258464 A1    Dec. 23, 2004

(51) Int. Cl.
*E05D 3/10* (2006.01)
*E05C 17/64* (2006.01)

(52) U.S. Cl. .......................................... 16/367; 16/340

(58) Field of Classification Search ............... 16/340, 16/367, 366, 342; 361/680, 681, 682, 683; 248/917–919, 920–922, 125.1, 125.8, 278.1; 348/831; 353/13
See application file for complete search history.

(56) References Cited

U.S. PATENT DOCUMENTS

| | | | |
|---|---|---|---|
| 6,018,847 A * | 2/2000 | Lu ............................... | 16/337 |
| 6,105,919 A * | 8/2000 | Min ............................. | 248/418 |
| 6,189,842 B1 * | 2/2001 | Bergeron Gull et al. . | 248/125.1 |
| 6,256,837 B1 * | 7/2001 | Lan et al. ..................... | 16/334 |
| 6,347,433 B1 * | 2/2002 | Novin et al. .................. | 16/367 |
| 6,427,288 B1 * | 8/2002 | Saito ............................ | 16/361 |
| 6,671,927 B1 * | 1/2004 | Chen ............................ | 16/339 |
| 6,694,569 B1 * | 2/2004 | Chien et al. ................. | 16/367 |
| 6,694,570 B1 * | 2/2004 | Chen ............................ | 16/367 |
| 6,742,221 B1 * | 6/2004 | Lu et al. ....................... | 16/367 |
| 6,742,756 B1 * | 6/2004 | Fimeri et al. ............... | 248/479 |
| 6,772,983 B1 * | 8/2004 | Liao et al. ............... | 248/291.1 |
| 6,804,861 B1 * | 10/2004 | Hsu ............................ | 16/366 |
| 2004/0139579 A1 * | 7/2004 | Su ............................... | 16/351 |

FOREIGN PATENT DOCUMENTS

| | | | |
|---|---|---|---|
| JP | 11257342 A | * | 9/1999 |
| JP | 11272187 A | * | 10/1999 |
| JP | 2003120652 A | * | 4/2003 |
| JP | 2004053927 A | * | 2/2004 |

* cited by examiner

*Primary Examiner*—Chuck Mah
(74) *Attorney, Agent, or Firm*—Jianq Chyun IP Office (57) ABSTRACT

A rotation apparatus comprises a sleeve, a retaining means, a first base, a second base, a pivot and a pivot base. The sleeve passes through the first base and the second base and screws into the retaining means. The pivot is fixed onto the second base and the pivot base is coupled to the pivot. After mounting a display panel to a host body via the rotation apparatus, the display panel can be flipped open via the pivot/pivot base linkage and then rotated around the axis of the sleeve. Furthermore, the components constituting the rotation apparatus are easy to manufacture and assemble.

32 Claims, 5 Drawing Sheets

ROTATION APPARATUS

BACKGROUND OF INVENTION

1. Field of Invention

The present invention relates to a rotation apparatus. More particularly, the present invention relates to a rotation apparatus used in a portable electrical appliance.

2. Description of Related Art

To meet the high-speed, high-efficiency, lightweight and streamline requirements of modern day electronic products, electronic components are increasingly miniaturized. With component miniaturization, various types of portable electronic appliances including notebook PCs, mobile phones, electronic dictionaries, personal digital assistants (PDAs), digital versatile disk players (DVD players), web pads and tablet PCs are out in the market.

Figure 1:
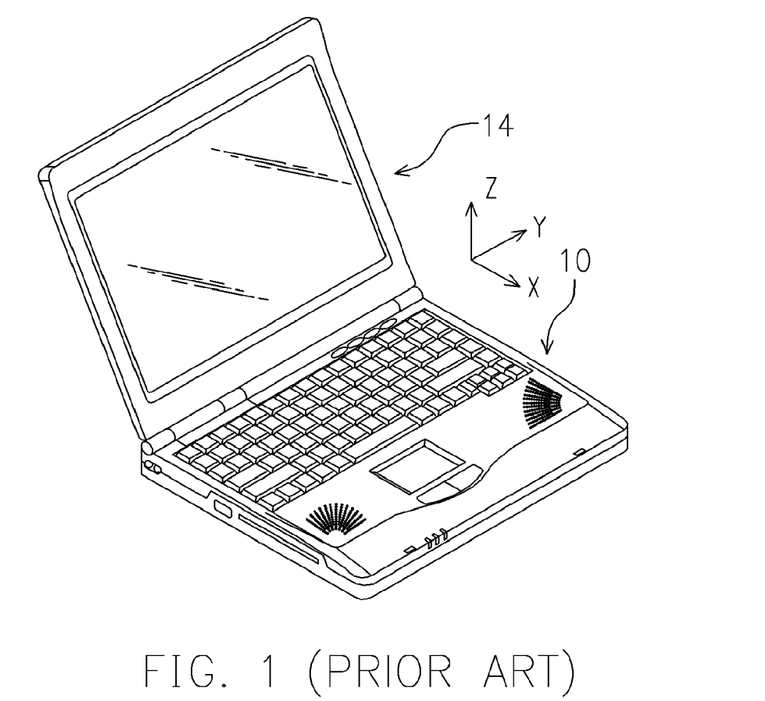
FIG. 1 is a perspective view of a conventional notebook computer.

FIG. 1 is a perspective view of a conventional notebook computer. The notebook computer shown in FIG. 1 mainly comprises a host body 10 and a display panel 14. In general, the display panel 14 is a liquid crystal module (LCM) connected to a driving and control circuit inside the host 10 through a flexible circuit board. The display panel 14 is hinged onto the host 10. Hence, the display panel 14 is free to flip open through a pivot set along the Y-axis of the host 10 but is prevented from rotating in the Z-axis.

SUMMARY OF INVENTION

Accordingly, one object of the present invention is to provide a rotation apparatus having a host body, a display panel and a rotation apparatus that facilitates the display panel to flip open and rotate relative to the host body. Hence, the display panel on the portable electrical appliance is more versatile under most operating conditions.

To achieve these and other advantages and in accordance with the purpose of the invention, as embodied and broadly described herein, the invention provides a rotation apparatus. The rotation apparatus mainly comprises a sleeve, a retaining means, a first base and a second base. One end of the sleeve has a stopper and the outer wall of the sleeve has threads. The threads on the sleeve are located on the outer wall away from the stopper. Furthermore, the outer wall of the sleeve also has a transmission flat or a transmission slot. The first base is set up over the retaining means. The first base has a first opening such as a circular opening or other types of openings that permits the sleeve to pass through without impeding the rotation of the sleeve. The second base is set up over the first base. The second base has a second opening with a profile that matches the outer wall of the sleeve. The sleeve passes through the first opening in the first base and the second opening in the second base and screws into the retaining means. Since the second opening in the second base has a profile that matches the outer wall of the sleeve, the sleeve can be rotated via the second base.

In this embodiment, the first base furthermore comprises a protruding pin and at least a latching slot. The protruding pin is located on a surface away from the retaining means and the latching slot is located somewhere around the peripheral region of the first opening. In addition, the rotation apparatus furthermore comprises a rotation-limiting ring, a buffering element, a latching ring, a first pad ring, a second pad ring and a third pad ring. The rotation-limiting ring slides into the sleeve between the first base and the second base. The outer edge of the rotation-limiting ring has a pair of engaging means that correspond to the protruding pin. The buffering element comprises a first buffering ring and a second buffering ring both slide into the sleeve. The inner edge and the outer edge of the first buffering ring are on different planes. Similarly, the inner edge and the outer edge of the second buffering ring are on different planes. The outer edge of the second buffering ring is in contact with the outer edge of the first buffering ring. A gap is maintained between the inner edge of the first buffering ring and the inner edge of the second buffering ring. The latching ring is also slide into the sleeve between the first base and the buffering element. The latching ring has at least a bump on the surface close to the first base that corresponds with the latching slot. The first pad ring, the second pad ring and the third pad ring also slide into the sleeve. The first pad ring, the second pad ring and the third pad ring are located between the buffering element and the retaining means, the first base and the latching ring and the latching ring and the buffering element respectively. In addition, the second opening in the second base, the inner edge of the latching ring and the inner edge of the rotation-limiting ring all have a profile that matches the outer wall of the sleeve. Hence, the second base is able to drive the sleeve, the latching ring and the rotation-limiting ring into rotation.

The rotation apparatus of this invention also comprises a pivot and a pivot base. The pivot is tightened to the second base with the axle direction of the pivot perpendicular to the axis of the sleeve. The pivot base is coupled to the pivot. However, the pivot and the second base can be fabricated as an integrative unit.

After the host body and the display panel are connected together through the rotation apparatus, the portable electrical appliance can be opened or closed via the pivot/pivot base linkage and can be rotated around the axis of the sleeve. Furthermore, the components constituting the rotation apparatus are easy to manufacture and assemble.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

Figure 2:
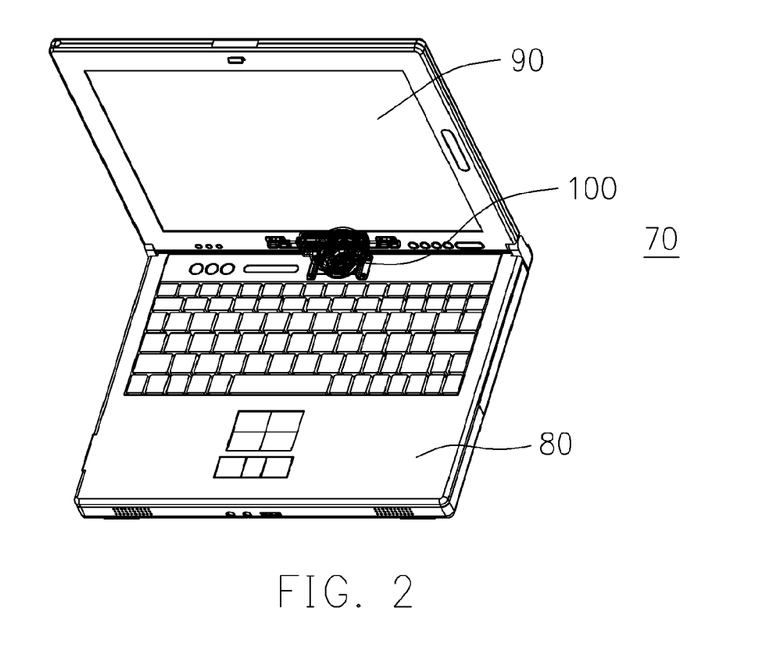
FIG. 2 is a perspective view of a portable electrical appliance having a rotation apparatus according to one preferred embodiment of this invention.

FIG. 2 is a perspective view of a portable electrical appliance having a rotation apparatus according to one preferred embodiment of this invention. As shown in FIG. 2, a portable electrical appliance 70 mainly comprises a host body 80, a display panel 90 and a rotation apparatus 100. The portable electrical appliance 70 is a notebook computer, a digital versatile disk player or a mobile phone for example. The rotation apparatus 100 provides a design with two rotating degrees of freedom. One rotating degree of freedom lies in the rotation about a central axis of the display panel 90 and a second rotating degree of freedom lies in flipping open the display panel 90 from the host body 80.

Figure 3:
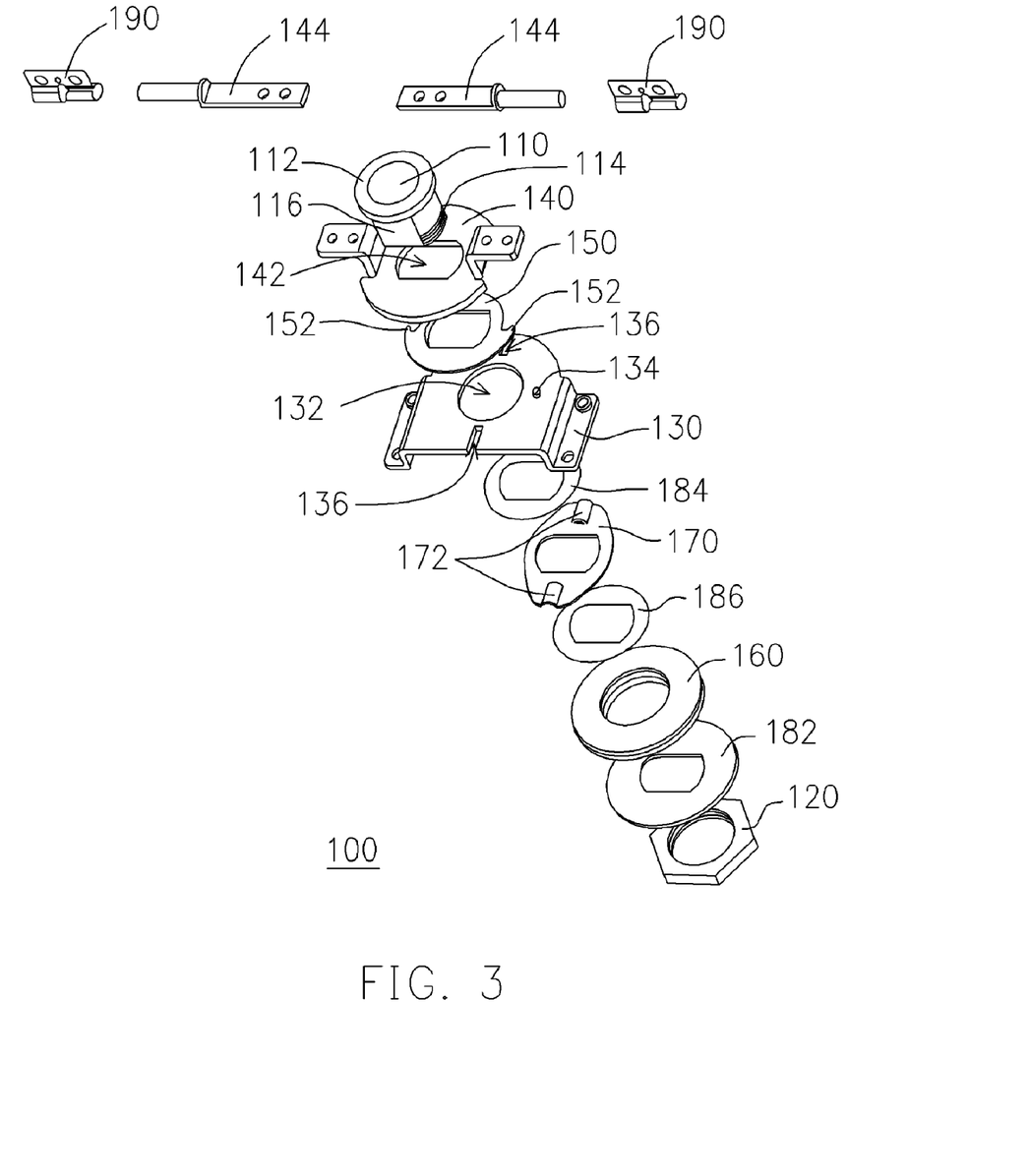
FIG. 3 is an explosion view showing all the components constituting a rotation apparatus according to one preferred embodiment of this invention.

FIG. 3 is an explosion view showing all the components constituting a rotation apparatus according to one preferred embodiment of this invention. As shown in FIG. 3, the rotation apparatus 100 for the display panel 90 mainly comprises a sleeve 110, a nut 120, a first base 130 and a second base 140. One end of the sleeve 110 has a stopper 112. The outer wall of the sleeve 110 has a thread 114 located on the outer wall far away from the stopper 112. The other components of the rotation apparatus 100 are retained between the stopper 112 and the nut 120 after the nut 120 is screwed into a thread 114 of the sleeve 110. Furthermore, the outer wall of the sleeve 110 has a transmission flat 116 or a transmission slot for driving components whose inner edges has a shape that matches the outer wall of the sleeve 110. Obviously, the transmission flat 116 can be replaced by a transmission slot or any design that will not impede the rotation of the rotation apparatus 100. The only criterion is that the inner edges of these components must be fabricated into a shape that matches the outer wall of the sleeve 110. In FIG. 3, the sleeve 110 has a transmission flat 116.

The first base 130 is set up above the nut 120. The first base 130 has a first opening 132. The first opening 132 has a circular shape or some other shapes that permit the sleeve 110 to pass through without impeding its rotation. The second base 140 is set up above the first base 130. The second base 140 has a second opening 142. The second opening 142 has a shape that matches the outer wall profile of the sleeve 110. The sleeve 110 passes through the first opening 132 of the first base 130 and the second opening 142 of the second base 140 before tightly screwed into the nut 120. Since the second opening 142 has a shape that matches the outer wall of the sleeve 110, the second base 140 is able to drive the sleeve 110 into rotation.

The first base 130 furthermore includes a protruding pin 134 and at least a latching slot 136. The protruding pin 134 is located on a surface away from the nut 120 and the latching slot 136 is located somewhere around the peripheral region of the first opening 132. In view of the protruding pin 134 and the latching slot 136 design, the rotation apparatus 100 furthermore comprises a rotation-limiting ring 150 and a latching ring 170. In addition, the rotation apparatus 100 of this embodiment also includes a buffering element 160, a first pad ring 182, a second pad ring 184 and a third pad ring 186. All the interior edge profile of the rotation-limiting ring 150, the latching ring 170, the first pad ring 182, the second pad ring 184 and the third pad ring 186 match the outer wall profile of the sleeve 110. Hence, all these component will be driven when the sleeve 110 rotates.

Aside from the rotation apparatus for rotating the display panel 90, this embodiment furthermore includes a pivot 144 and a pivot base 190 for flipping the display panel 90 open or close relative to the host body 80. The pivot 144 is locked up with the second base 140. The axle line of the pivot 144 is perpendicular to the axle direction of the sleeve 110. The pivot base 190 engages with the pivot 144. In addition, the pivot 144 and the second base 140 can be an integrative unit.

The aforementioned is a description of various components and their relative positions with respective to each other inside the rotation apparatus 100. In the following, finer structural design and operating mechanism of the rotation-limiting ring 150, the buffering element 160, the first pad ring 182, the second pad ring 184 and the third pad ring 186 are described.

As shown in FIGS. 2 and 3, the rotation-limiting ring 150 is located between the first base 130 and the second base 140. The outer edge of the rotation-limiting ring 150 has two engaging means 152 that correspond with the protruding pin 134. When the second base 140 rotates, the rotation-limiting ring 150 is also driven. Due to the setup between the latching hook 152 and the protruding pin 134, an angle of rotation of more than 180° is forbidden. In this way, over-twisting of the circuit wires linking the host 80 and the display panel 90 is largely prevented. Obviously, the engaging means 152 can be set in many ways to obtain other desired suitable angle of rotation.

Figure 4:
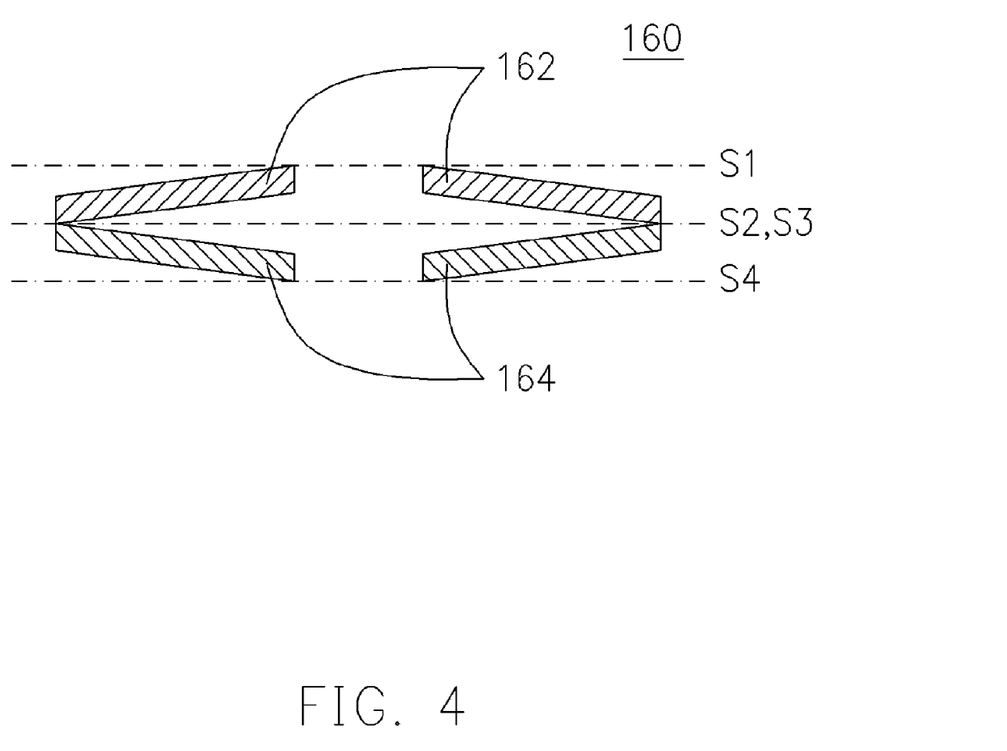
FIG. 4 is a diagram showing the buffering element with the rotation apparatus according to one preferred embodiment of this invention.
Figure 5A:
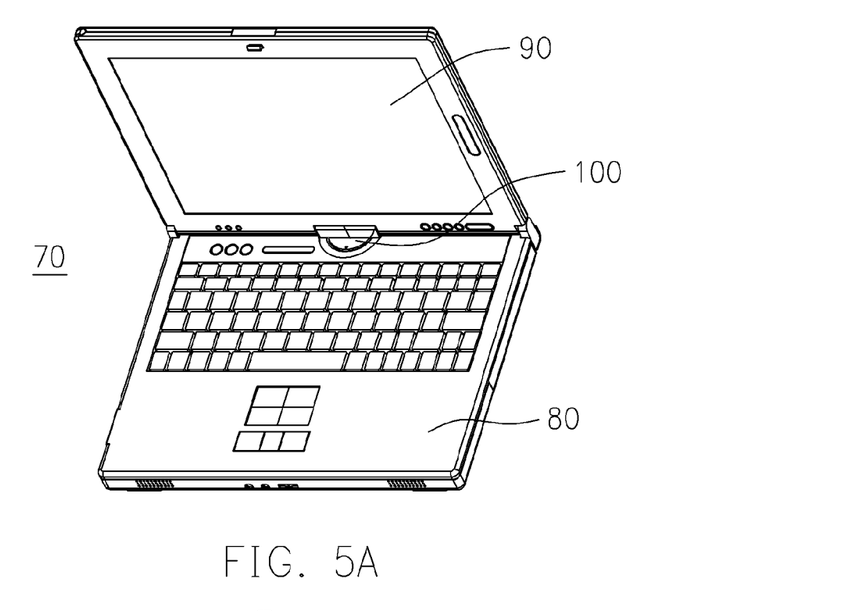
FIGS. 5A through 5D are diagrams showing a few possible orientations of the display panel according to the embodiment of this invention.
Figure 5B:
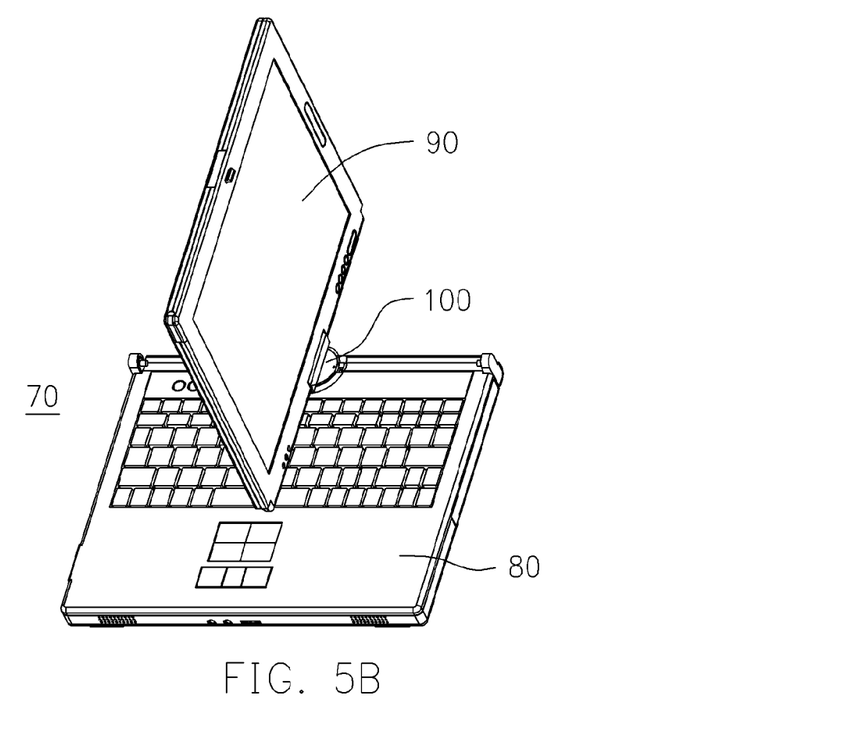
Figure 5C:
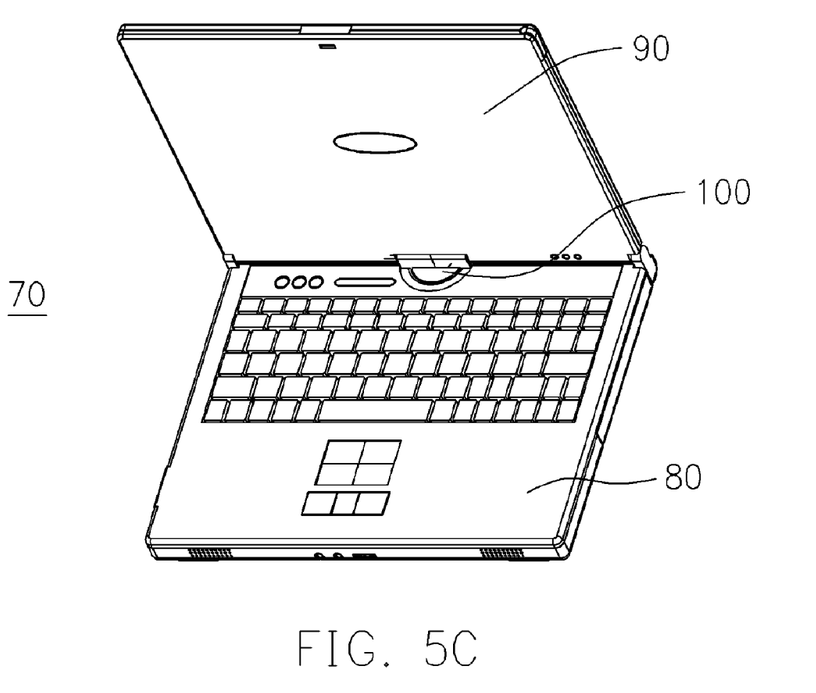
Figure 5D:
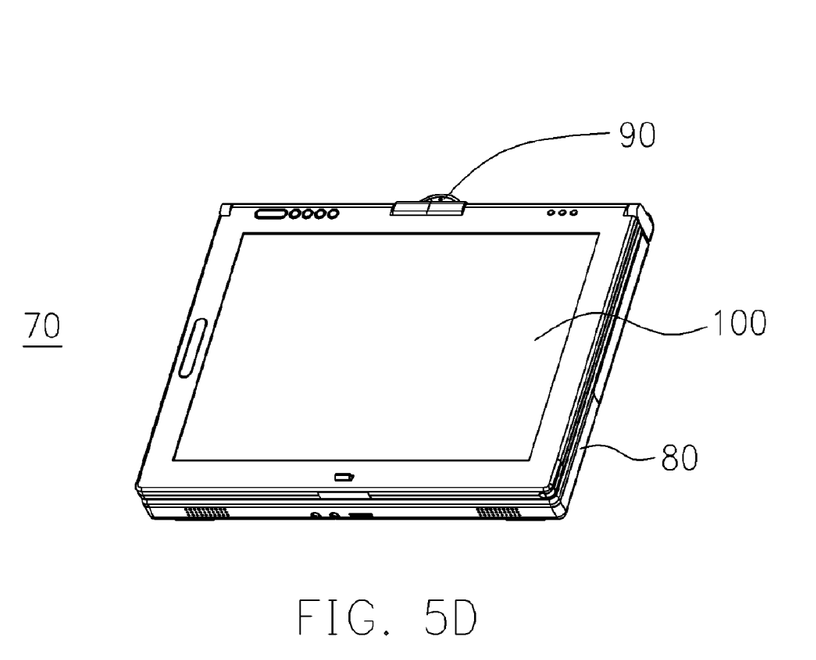

FIG. 4 is a diagram showing the buffering element with the rotation apparatus according to one preferred embodiment of this invention. The buffering element 160 comprises a first buffering ring 162 and a second buffering ring 164 as shown in FIGS. 3 and 4. The inner edge and the outer edge of the first buffering ring 162 are located on a first plane S1 and a second plane S2. The first plane S1 and the second plane S2 are parallel to each other. The outer edge of the second buffering ring 164 is in contact with the outer edge of the first buffering ring 162. The inner edge and the outer edge of the second buffering ring 164 are located on a third plane S3 and a fourth plane S4 respectively. The third plane S3 and the fourth plane S4 are parallel to each other. When the rotation apparatus 100 rotates, there is slight variation in the distance (greater or smaller) between the stopper 112 and the nut 120 because the sleeve 110 screws into or out of the nut 120. The buffering element 160 is a means of ensuring tight engagement of every component within the rotation apparatus 100 even when the display panel is rotated so that the sensation of loosening up the display panel can be voided.

The latching ring 170 is located between the first base 130 and the buffering element 160 as shown in FIGS. 2 and 3. The latching ring 170 has at least a bump 172 on a surface close to the first base 130 that corresponds with the latching slot 136. When the sleeve 110 has made an angular rotation of close to 180°, the bump 172 will slide into the latching slot 136 and produce a clicking sound. The clicking sound serves as a reminder to a user that the display panel 90 has already rotated to a desired position. The clicking sound issued when the bump 172 slips into the latching slot 136 prevents a user damaging the rotation apparatus 100 and the connecting circuit due to an over-twisting the display panel 90.

The first pad ring 182 is located between the buffering element 160 and the nut 120. The second pad ring 184 is located between the first base 130 and the latching ring 170. The third pad ring 186 is located between the latching ring 170 and the buffering element 160. These pad rings serve as buffers for reducing the friction between various components during rotation. In addition, the first pad ring 182 is fabricated using a soft material. Aside from preventing frictional damage, the first pad ring 182 also protects the interior components against any possible impact by external objects.

FIGS. 5A through 5D are diagrams showing a few possible orientations of the display panel according to the embodiment of this invention. The portable electrical appliance of this invention has a display panel designed to flip open from a host via a pivot at a connecting edge and then rotate the display panel in a direction perpendicular to the connecting edge. The display panel is also designed to stack on top of the host with the display screen facing out. In addition, various components constituting the rotating structure are easy to manufacture and assemble.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A rotation apparatus for connecting a first body to a second body, comprising:
   a sleeve having one end including a stopper and an outer wall including screw threads;
   a retaining means for engaging with said sleeve;
   a first base connected to the first body above the retaining means, wherein the first base has a first opening;
   a second base connected to the second body above the first base, wherein the second base has a second opening, the second opening has a shape that matches the outer wall of the sleeve; and
   a rotation-limiting ring located between the first base and the second base, the first base furthermore comprises a protruding pin, the outer edge of the rotation-limiting ring has a pair of engaging means for engaging with the protruding pin, the inner edge of the rotation-limiting ring has a profile that matches the outer wall of the sleeve, and the sleeve passes through the rotation-limiting ring so that the rotation-limiting ring can rotate when driven by the angular movement is limited by the engaging means,
   wherein the sleeve passes through the first opening of the first base and the second opening of the second base and screws into the retaining means so that the sleeve is able to rotate by moving the second base.

2. The rotation apparatus of claim 1, wherein the outer wall of the sleeve further comprises a transmission flat.

3. The rotation apparatus of claim 1, wherein the outer wall of the sleeve further comprises a transmission slot.

4. The rotation apparatus of claim 1, wherein the screw threads on the outer wall of the sleeve are located one end far away from the stopper.

5. The rotation apparatus of claim 1, wherein the structure further comprises a pivot locked onto the second base with the axle line of the pivot positioned in a direction perpendicular to the axle line of the sleeve.

6. The rotation apparatus of claim 5, wherein the pivot and the second base are formed together as an integrative unit.

7. The rotation apparatus of claim 5, wherein the structure further comprises a pivot base coupled to the pivot.

8. A rotation apparatus for connecting a first body to a second body, comprising:
   a sleeve having one end including a stopper and an outer wall including screw threads;
   a retaining means for engaging with said sleeve;
   a first base connected to the first body above the retaining means, wherein the first base has a first opening; and
   a second base connected to the second body above the first base, wherein the second base has a second opening, the second opening has a shape that matches the outer wall of the sleeve,
   wherein the sleeve passes through the first opening of the first base and the second opening of the second base and screws into the retaining means so that the sleeve is able to rotate by moving the second base,
   wherein the structure further comprises:
   a buffering element between the first base and the retaining means, the buffering element having:
   a first buffering ring slid into the sleeve, wherein the inner edge and the outer edge of the first buffering ring lie in different planes; and
   a second buffering ring slid into the sleeve, wherein the inner edge and the outer edge of the second buffering ring lie in different planes such that the outer edge of the first buffering ring is in contact with the outer edge of the second buffering ring and the inner edge of the first buffering ring seperates from the inner edge of the second buffering ring by a gap; and
   a latching ring located between the first base and the buffering element, the inner edge of the latching ring has a profile that matches the outer wall of the sleeve, the latching ring slides into the sleeve so that the latching ring is able to follow the rotation of the sleeve, the first base further has at least a latching slot located somewhere in the peripheral region around the first opening and the latching ring has at least a bump on a surface close to the first base that can click into the latching slot.

9. The rotation apparatus of claim 8, wherein the structure further comprises a first pad ring located between the buffering element and the retaining means, the inner edge of the first pad ring has a profile that matches the outer wall of the sleeve and the first pad ring slides into the sleeve so that the first pad ring is able to follow the rotation of the sleeve.

10. The rotation apparatus of claim 8, wherein the structure further comprises a second pad ring located between the first base and the latching ring, the inner edge of the second pad ring has a profile that matches the outer wall of the sleeve so that the second pad ring is able to follow the rotation of the sleeve.

11. The rotation apparatus of claim 8, wherein the structure further comprises a third pad ring located between the latching ring and the buffering element, the inner edge of the third pad ring has a profile that matches the outer wall of the sleeve so that the third pad ring is able to follow the rotation of the sleeve.

12. A rotation apparatus for connecting a first body to a second body, comprising:
   a sleeve having one end including a stopper and an outer wall including screw threads;
   a retaining means for engaging with said sleeve;
   a buffering element located above retaining means, having
   a first buffering ring slid into the sleeve, wherein the first buffering ring has an inner edge and an outer edge that lie on different planes; and
   a second buffering ring slid into the sleeve, wherein the second buffering ring has an inner edge and an outer edge that lie on different planes, wherein the outer edge of the first buffering ring and the outer edge of the second buffering ring are in contact and the inner edge of the first buffering ring and the inner edge of the second buffering ring are separated by a gap;
   a latching ring located above the buffering element;
   a first base connected to the first body above the latching ring, wherein the first base has a first opening;
   a rotation-limiting ring located above the first base; and a second base connected to the second body above the rotation-limiting ring, wherein the second base has a second opening, wherein the inner edge of the latching ring and the inner edge of the rotation-limiting ring have a shape that matches the outer wall of the sleeve;

wherein the sleeve passes through the buffering element, the latching ring, the first opening of the first base, the rotation-limiting ring and the second opening of the second base and screws into the retaining means so that the sleeve, the latching ring and the rotation-limiting ring are able to rotate together via any movement in the second base.

13. The rotation apparatus of claim 12 wherein the outer wall of the sleeve further comprises a transmission flat.

14. The rotation apparatus of claim 12, wherein the outer wall of the sleeve further comprises a transmission slot.

15. The rotation apparatus of claim 12, wherein the screw threads on the outer wall of the sleeve are located one end far away from the stopper.

16. The rotation apparatus of claim 12, wherein the first base further comprises a protruding pin and the outer edge of the rotation-limiting ring has a pair of engaging means for engaging with the protruding pin so that the rotation-limiting ring can rotate when driven but the angular movement is limited by the engaging means.

17. The rotation apparatus of claim 12, wherein the first base further comprises at least a latching slot located somewhere around the peripheral region of the first opening and the latching ring has at least a bump on a surface close to the first base for clicking into the latching slot.

18. The rotation apparatus of claim 12, wherein the structure further comprises a first pad ring located between the buffering element and the retaining means such that the inner edge of the first pad ring has a profile that matches the outer wall of the sleeve and the first pad ring slides into the sleeve so that the first pad ring is able to follow the rotation of the sleeve.

19. The rotation apparatus of claim 12, wherein the structure further comprises a second pad ring located between the first base and the latching ring, the inner edge of the second pad ring has a profile that matches the outer wall of the sleeve so that the second pad ring is able to follow the rotation of the sleeve.

20. The rotation apparatus of claim 12, wherein the structure further comprises a third pad ring located between the latching ring and the buffering element, the inner edge of the third pad ring has a profile that matches the outer wall of the sleeve so that the third pad ring is able to follow the rotation of the sleeve.

21. The rotation apparatus of claim 12, wherein the structure further comprises a pivot locked onto the second base with the axle line of the pivot positioned in a direction perpendicular to the axle line of the sleeve.

22. The rotation apparatus of claim 21, wherein the pivot and the second base are integrally formed.

23. The rotation apparatus of claim 21, wherein the structure further comprises a pivot base coupled to the pivot.

24. A portable electrical appliance, comprising:
a host body;
a display panel;
a rotation apparatus connecting the edge of the display panel to the edge of the host body, having:
a sleeve with one end having a stopper and a plurality of screw threads on the outer wall of the sleeve;
retaining means for engaging with said sleeve;
a first base connected to the host body above the retaining means, wherein the first base has a first opening;
a second base connected to the display panel above the first base, wherein the second base has a second opening;
a pivot locked onto the second base such that the axis of the pivot is perpendicular to the axis of the sleeve;
a pivot base coupled to the pivot, wherein the sleeve passes through the first opening of the first base and the second opening of the second base and screws into the retaining means, wherein the sleeve is able to rotate when driven by the second base; and
a rotation-limiting ring located between the first base and the second base, the first base further comprises a protruding pin, the outer edge of the rotation-limiting ring has a pair of engaging means for engaging with the protruding pin, the inner edge of the rotation-limiting ring has a profile that matches the outer wall of the sleeve, and the sleeve passes through the rotation-limiting ring so that the rotation-limiting ring can rotate when driven but the angular movement is limited by the engaging means.

25. The portable electrical appliance of claim 24, wherein the outer wall of the sleeve further comprises a transmission flat.

26. The portable electrical appliance of claim 24, wherein the outer wall of the sleeve further comprises a transmission slot.

27. The portable electrical appliance of claim 24, wherein the screw threads on the outer wall of the sleeve are located one end far away from the stopper.

28. The portable electrical appliance of claim 24, wherein the pivot and the second base are formed together as an integrative unit.

29. A portable electrical appliance, comprising:
a host body;
a display panel;
a rotation apparatus connecting the edge of the display panel to the edge of the host body, having:
a sleeve with one end having a stopper and a plurality of screw threads on the outer wall of the sleeve;
retaining means for engaging with said sleeve;
a first base connected to the host body above the retaining means, wherein the first base has a first opening;
a second base connected to the display panel above the first base, wherein the second base has a second opening;
a pivot locked onto the second base such that the axis of the pivot is perpendicular to the axis of the sleeve;
a pivot base coupled to the pivot, wherein the sleeve passes through the first opening of the first base and the second opening of the second base and screws into the retaining means, wherein the sleeve is able to rotate when driven by the second base;
a buffering element between the first base and the retaining means, the buffering element having:
a first buffering ring slid into the sleeve, wherein the inner edge and the outer edge of the first buffering ring lie in different planes; and
a second buffering ring slid into the sleeve, wherein the inner edge and the outer edge of the second buffering ring lie in different planes such that the outer edge of the first buffering ring is in contact with the outer edge of the second buffering ring and the inner edge of the first buffering ring seperates from the inner edge of the second buffering ring by a gap; and a first pad ring located between the buffering element and the retaining means, the inner edge of the first pad ring has a profile that matches the outer wall of the sleeve and the first pad ring slides into the sleeve so that the first pad ring is able to follow the rotation of the sleeve.

30. A portable electrical appliance, comprising:
a host body;
a display panel;
a rotation apparatus connecting the edge of the display panel to the edge of the host body, having:
  a sleeve with one end having a stopper and a plurality of screw threads on the outer wall of the sleeve;
  retaining means for engaging with said sleeve;
  a first base connected to the host body above the retaining means, wherein the first base has a first opening;
  a second base connected to the display panel above the first base, wherein the second base has a second opening;
  a pivot locked onto the second base such that the axis of the pivot is perpendicular to the axis of the sleeve;
  a pivot base coupled to the pivot, wherein the sleeve passes through the first opening of the first base and the second opening of the second base and screws into the retaining means, wherein the sleeve is able to rotate when driven by the second base;
  a buffering element between the first base and the retaining means, the buffering element having:
    a first buffering ring slid into the sleeve, wherein the inner edge and the outer edge of the first buffering ring lie in different planes; and
    a second buffering ring slid into the sleeve, wherein the inner edge and the outer edge of the second buffering ring lie in different planes such that the outer edge of the first buffering ring is in contact with the outer edge of the second buffering ring and the inner edge of the first buffering ring seperates from the inner edge of the second buffering ring by a gap; and
  a latching ring located between the first base and the buffering element, the inner edge of the latching ring has a profile that matches the outer wall of the sleeve, the latching ring slides into the sleeve so that the latching ring is able to follow the rotation of the sleeve, the first base furthermore has at least a latching slot located somewhere in the peripheral region around the first opening and the latching ring has at least a bump on a surface close to the first base that can click into the latching slot.

31. The portable electrical appliance of claim 30, wherein the rotation apparatus further comprises a second pad ring located between the first base and the latching ring, the inner edge of the second pad ring has a profile that matches the outer wall of the sleeve so that the second pad ring is able to follow the rotation of the sleeve.

32. The portable electrical appliance of claim 30, wherein the rotation apparatus further comprises a third pad ring located between the latching ring and the buffering element, the inner edge of the third pad ring has a profile that matches the outer wall of the sleeve so that the third pad ring is able to follow the rotation of the sleeve.

* * * * *